Nov. 17, 1931. T. STENHOUSE 1,832,331
GLASS FEEDER
Filed Aug. 5, 1926
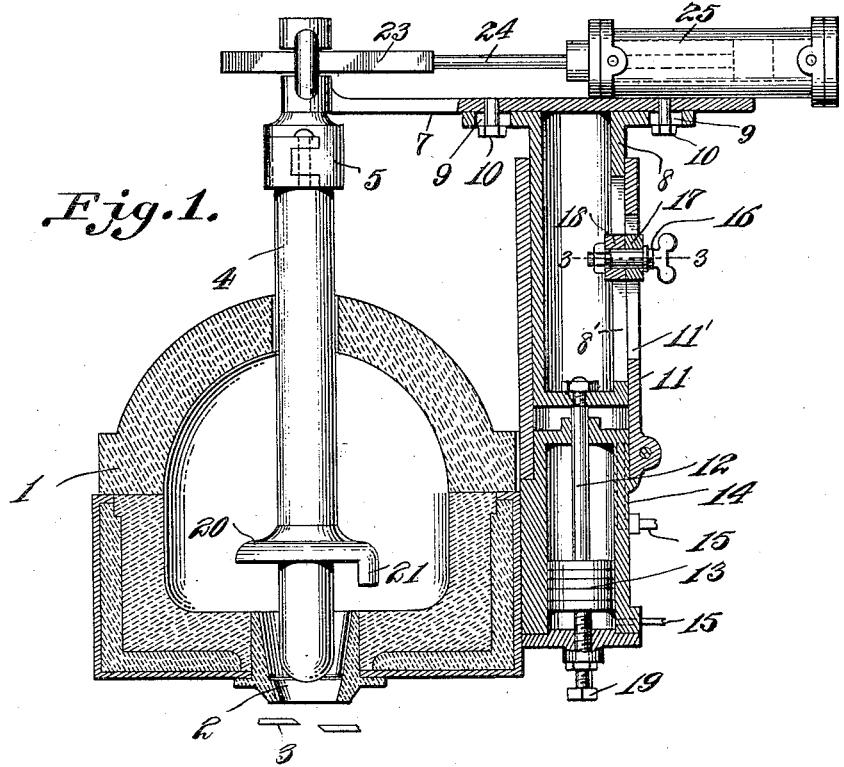
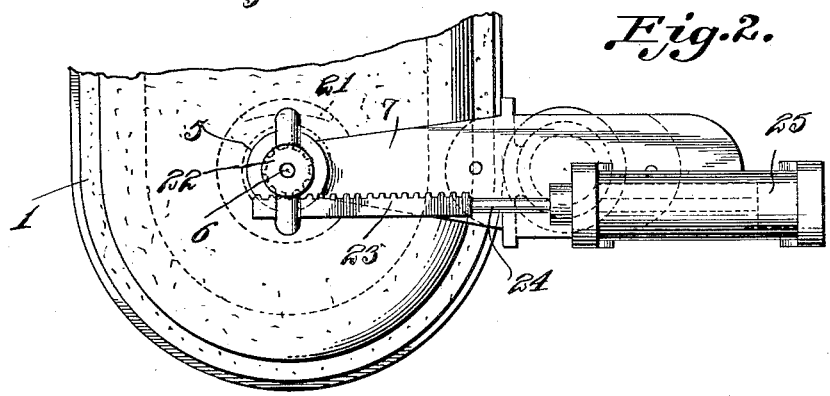
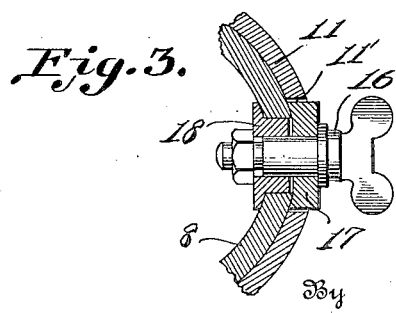
Inventor
Thomas Stenhouse.
By Eccleston & Eccleston
Attorneys Patented Nov. 17, 1931

1,832,331

UNITED STATES PATENT OFFICE

THOMAS STENHOUSE, OF WASHINGTON, PENNSYLVANIA, ASSIGNOR TO HAZEL-ATLAS GLASS CO., OF WHEELING, WEST VIRGINIA, A CORPORATION OF WEST VIRGINIA

GLASS FEEDER

Application filed August 5, 1926. Serial No. 127,410.

This invention relates to glass feeders and more particularly to feeders of the well known reciprocating plunger type; and one of the purposes of the present invention is to provide a simple and practical means which will cause the charges or gobs of glass to be of uniform homogeneity and temperature. I am aware that various devices have been devised to accomplish this desirable result, but these previously known devices have certain limitations which render them inefficient in actual operation.

A further object of the invention is to provide means whereby the glass may be delivered in larger charges or gobs, and with greater control, both in the manner of expulsion and suspension.

A further object of the invention is to provide means whereby a larger adhesive surface operates to return the stub to the influence of the glass in the flow spout after the charge has been severed.

Other objects and advantages of the invention will be apparent to those skilled in the art, from the following detailed description, taken in connection with the accompanying drawings; in which, Figure 1 is a vertical section through a flow spout of an ordinary glass furnace showing my improved plunger in side elevation.

Figure 2 is a fragmentary plan view of the flow spout and the operating mechanism for the plunger; and Figure 3 is an enlarged horizontal section on line 3—3 of Figure 1.

Referring to the drawings in detail, the numeral 1 indicates the flow spout which is provided with the usual discharge orifice 2 and shears 3.

Mounted in the flow spout and extending through the top thereof so as to be attached to a reciprocating mechanism is a plug or plunger 4 which is clamped within the hinge lock 5; the latter being fastened to the vertically disposed shaft 6 which is rotatably mounted on a cross-arm 7.

This cross-arm 7 is adjustably mounted on the upper end of a reciprocating member 8 by means of slots 9 and bolts 10, and these adjustments serve to properly align the plug 4 with respect to the discharge orifice 2. The reciprocating member 8 is slidably mounted within a sleeve 11 which acts as a guide therefor and the lower end of the member 8 is connected to a piston rod 12 carried by piston 13. The piston is mounted within a cylinder 14 provided with air ports 15 which direct compressed air to opposite sides of the piston in the usual manner.

It will be noted that the reciprocating member 8 is provided with an elongated slot 8'; and extending through this slot as well as through slot 11' in sleeve 11 is a bolt 16 on which are mounted the two clamping members 17 and 18. By tightening up on the bolt 16 the clamping members are caused to grip between them the wall of the reciprocating member 8, and due to the extension of the bolt and clamps into the slot 11' it will be apparent that these members serve as a guide for the member 8 and prevent its rotation with respect to the sleeve 11. Furthermore, it will be apparent that the members 16, 17 and 18 may be clamped at any position along the slot 8' and will therefore serve as an adjustable stop to limit the upward movement of the piston 13 and plunger 4; the lower limit of piston 13 and plunger 4 being varied of course, by the screw 19 located in the lower end of the cylinder 14.

Having now described the particular mechanism for reciprocating the plunger I will proceed with the description of the more important feature of the invention.

Mounted on the plunger adjacent the lower end thereof is a disc 20 provided with a downwardly extending flange or skirt 21 which is here shown (Figure 2) as extending through about 90° of the periphery of the disc, although this circumferential length of the flange may be varied to suit requirements.

The plunger 4 with its attached disc 20 and flange 21 in addition to being reciprocated by the mechanism hereinbefore described is adapted to be rotated about its longitudinal axis, and to this end a pinion 22 is keyed to the shaft 6 and cooperates with a rack 23 formed on the forward end of a piston rod 24. An air cylinder 25 is fixed to the cross-arm 7 and serves to impart a reciprocating movement in a horizontal plane to the rod 24 and rack 23, thus setting up through pinion 22 a periodic back and forth rotary movement in the plunger 4.

The operation of a plain reciprocating plunger is well understood by those skilled in the glass art and it will therefore suffice to set forth herein the operation of the disc 20 and flange 21 in connection with the operation of the plunger.

When the plug 4 is at rest, as regards its oscillating or rotating movement, the flange or dam 21 will extend directly across the channel of the flowing stream of glass, and it will cause the glass to be divided into two streams flowing around opposite sides of the plunger, thereby assisting in the diffusion of the liquid glass.

When the plunger is rotated, first in one direction and then in the opposite direction, the disc and flange will cause the glass to be first driven in one direction around the plug, and then be driven in the opposite direction around the plug, thereby further aiding in the diffusion of the glass. Of course, the mere rotation or oscillation of the ordinary cylindrical plug does, to a limited extent, correct the evil of non-uniformity of temperature, and such an operation of the plug is well known in the glass art; but it is apparent that the diffusion accomplished by the rotation or oscillation of the conventional plug is not comparable to the substantially complete diffusion which is accomplished by means of the novel construction disclosed herein.

Further, when the plunger is elevated, the disc will shed the glass in a manner somewhat analogous in a degree to a cascade, thus further assisting in the complete diffusion of the glass.

It is obvious that the device is capable of various modes of operation; the rack may give one complete revolution to the plunger and disc between each vertical ascent and descent of the plunger, each revolution alternating in direction. Or the plunger and disc may be oscillated or rotated during the vertical reciprocation thereof. Or various other combinations of reciprocating and rotating movement may be accomplished merely by varying the relative time at which the cylinders 14 and 25 operate; and of course, the present invention contemplates all such combinations of movement. And it is also apparent that the extent of the rotary or oscillating movement may be varied within wide limits.

Further, the invention also contemplates the mere vertical reciprocation of the plunger disc and flange without any rotary or oscillating movement thereof; and it also contemplates the mere rotation or oscillation of the plug, disc and flange, without any vertical reciprocation thereof.

It may be mentioned here that it is unnecessary to extend the flange 21 to the very bottom of the flow spout, since the upper stratum of glass is the most fluid and is therefore more responsive to the action of the dam or flange.

The disc 20 in addition to its function in aiding in the production of greater uniformity in the glass gobs both as to consistency and temperature, also serves to provide a greater control of the gobs due to its extended surface which is in contact with the glass. This increased surface not only aids in causing the expulsion of larger gobs when required but also furnishes a greater retractive force in returning the stub end of the stream after the gob has been detached.

From the foregoing description taken in connection with the accompanying drawings it will be observed that I have devised an exceedingly simple mechanism which may be readily incorporated in the ordinary reciprocating plug and which will function to deflect the hot stream of glass around the discharge orifice and to diffuse the same so as to produce a gob of uniform consistency and temperature, and which will also exert a better control over the stream as it issues from the orifice both as to the quantity of glass entering into the formation of the gob as well as to the retraction of the stream into the flow spout.

In accordance with the patent statutes I have described what I now believe to be the best embodiment of the invention, but it will be apparent that the invention is subject to many minor changes as to structure and operation, all of which I intend to include within the scope of the appended claims.

Having fully described the invention, what I claim is:

1. A glass feeder including a flow spout having a flow orifice, a plug mounted in vertical alignment with said orifice, and a dam spaced from the plug and carried thereby and extending only partly therearound.

2. A glass feeder including a flow spout having a flow orifice, a plug mounted in vertical alignment with said orifice, a dam spaced from the plug and carried thereby and extending only partly therearound, said dam being periodically raised and lowered.

3. A glass feeder including a flow spout having a flow orifice, a plug mounted in vertical alignment with said orifice, a dam spaced from the plug and carried thereby and extending only partly therearound, said dam being periodically rotated in opposite directions.

4. A glass feeder including a flow spout having a flow orifice, a plug mounted in vertical alignment with said orifice, a dam only partly surrounding said orifice, and means for periodically rotating said dam with the plug, in opposite directions.

5. A glass feeder including a flow spout having a flow orifice, a plug mounted in vertical alignment with said orifice, a dam only partly surrounding said orifice, and means for rotating said dam with the plug.

6. A glass feeder including a flow spout having a flow orifice, a plug mounted in vertical alignment with the flow orifice, a dam spaced from the plug and carried thereby, and means for rotating the plug.

7. A glass feeder including a flow spout having a flow orifice, a plug mounted in vertical alignment with said orifice, and a substantially vertical dam spaced from the plug and carried thereby.

8. A glass feeder including a flow spout having a flow orifice, a plug mounted in vertical alignment with said orifice, a substantially vertical dam spaced from the plug and carried thereby, and means for reciprocating the plug.

9. A glass feeder including a flow spout having a flow orifice, a plug mounted in vertical alignment with said orifice, a dam spaced from the plug and carried thereby, and means rotating the plug in opposite directions.

10. A glass feeder including a flow spout having a flow orifice, a plug mounted in vertical alignment with said orifice, a dam spaced from the plug and carried thereby, and means for reciprocating and rotating said plug.

11. A glass feeder including a flow spout having a flow orifice, a plug mounted in vertical alignment with said orifice, a substantially horizontal disc mounted on said plug adjacent its lower end, and a depending flange carried by said disc.

12. A glass feeder including a flow spout having a flow orifice, a plug mounted in vertical alignment with said orifice, a substantially horizontal disc mounted on said plug adjacent its lower end, and a substantially vertical depending flange carried by said disc.

13. A glass feeder including a flow spout having a flow orifice, a plug mounted in vertical alignment with said orifice, a substantially horizontal disc mounted on said plug adjacent its lower end, a flange carried by said disc, and means for reciprocating said plug.

14. A glass feeder including a flow spout having a flow orifice, a plug mounted in vertical alignment with said orifice, a substantially horizontal disc mounted on said plug adjacent its lower end, a flange carried by said disc, and means for rotating said plug.

15. A glass feeder including a flow spout having a flow orifice, a plug mounted in vertical alignment with said orifice, a substantially horizontal disc mounted on said plug adjacent its lower end, a flange carried by said disc, and means for reciprocating and rotating said plug.

THOMAS STENHOUSE.